United States Patent
Wuest et al.

(10) Patent No.: US 6,973,914 B2
(45) Date of Patent: Dec. 13, 2005

(54) METHOD FOR OPERATING AN INTERNAL COMBUSTION ENGINE AND DEVICE FOR EXECUTING THE METHOD

(75) Inventors: Marcel Wuest, Korntal (DE); Andreas Schaffrath, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/087,891

(22) Filed: Mar. 23, 2005

(65) Prior Publication Data

US 2005/0234635 A1    Oct. 20, 2005

(30) Foreign Application Priority Data

Apr. 17, 2004   (DE)   ................ 10 2004 018 676

(51) Int. Cl.[7] .......................... F02D 9/08; F02D 41/22
(52) U.S. Cl. .................. 123/396; 123/399; 123/198 D; 73/118.2
(58) Field of Search ............... 123/396, 399, 123/198 D; 73/118.1, 118.2

(56) References Cited

U.S. PATENT DOCUMENTS

| | | | |
|---|---|---|---|
| 6,701,282 B2 * | 3/2004 | Ting et al. | .................. 702/185 |
| 6,904,792 B2 * | 6/2005 | Wakahara | .................. 73/118.1 |
| 6,904,793 B2 * | 6/2005 | Kanke et al. | ............... 73/118.2 |

FOREIGN PATENT DOCUMENTS

| | | | |
|---|---|---|---|
| DE | 43 09 854 | 9/1994 | |
| DE | 197 50 191 | 3/1999 | |
| DE | 199 06 287 | 8/2000 | |
| DE | 199 58 394 | 6/2001 | |
| DE | 100 05 954 | 8/2001 | |
| EP | 0482692 | * 10/1991 | ........... F02D 41/22 |
| JP | 4-262032 | * 9/1992 | ........... F02D 41/22 |
| KR | 2003062833 | * 7/2003 | ........... F02D 41/22 |
| KR | 2003073563 | * 9/2003 | ........... F02D 45/00 |

* cited by examiner

Primary Examiner—Hai Huynh
(74) Attorney, Agent, or Firm—Kenyon & Kenyon

(57) ABSTRACT

A method for operating an internal combustion engine and a device for executing the method which are based on the fact that a throttle valve is situated in the intake port and an exhaust emission control device is situated in the exhaust system. The air flow setpoint value for the throttle valve is changed following occurrence of a request for heating and/or regenerating the exhaust emission control device. A first diagnostics of the throttle valve provides an error signal in the event of a throttle valve error. When the error signal and the request are present, a switch is made in a characteristics map from a first or a second dataset to an additional dataset on the basis of which at least one control signal of the internal combustion engine is provided.

9 Claims, 2 Drawing Sheets

METHOD FOR OPERATING AN INTERNAL COMBUSTION ENGINE AND DEVICE FOR EXECUTING THE METHOD

BACKGROUND INFORMATION

A method for detecting the load of an internal combustion engine is described in German Patent Application No. DE 197 50 191 in which a first measure for the air mass flow supplied to the engine is measured, while a second measure is determined indirectly from the position of a throttle valve. A diagnostic method pinpoints an error when the two measures deviate from one another to an inadmissible degree.

A method and a device for checking the position of an actuator for a motor vehicle are described in German Patent Application No. DE 199 58 394. An image processing system determines the image provided by a camera and determines the position of the actuator, which in this case is a throttle valve of an internal combustion engine. The method provides an error signal when the angle position of the throttle valve deviates from a predefined setpoint value.

A method for operating an internal combustion engine is described in German Patent No. DE 199 06 287, a particulate filter being situated in the engine's exhaust duct. The load condition of the particulate filter is detected by a pressure sensor which determines the differential pressure occurring at the particulate filter, the differential pressure being a performance characteristic of the particulate filter. Subsequent to the request for regenerating the particulate filter, at least one measure is introduced, resulting in heating of the particulate filter. An increase in the exhaust gas temperature is provided. Moreover, a temperature sensor may be provided which determines the temperature at or in the particulate filter as another performance characteristic of the particulate filter.

A method for controlling the secondary air supply for an internal combustion engine is described in German Patent No. DE 43 09 854 in which a secondary air pump is provided for adding fresh air to the exhaust gas of the internal combustion engine, the secondary air pump being switchable in its performance. Subsequent to the request for heating a catalytic converter situated in the exhaust duct of the engine, the secondary air pump is put into operation. The added fresh air may exothermally react with combustible components of the exhaust gas and may thus contribute to heating of the exhaust gas and/or of a catalytic converter situated in the exhaust duct.

A method for desulfurizing a storage catalytic converter is described in German Patent Application No. DE 100 05 954 in which, subsequent to a request, the catalytic converter is heated due to the fact that combustible exhaust gas components and oxygen are moved downstream from the catalytic converter, either simultaneously or in alternating rapid succession, and react exothermally either downstream from or in the catalytic converter.

SUMMARY OF THE INVENTION

The present invention is based on the object of providing a method for operating an internal combustion engine which ensures heating and/or regeneration of an exhaust emission control device of an internal combustion engine.

The present invention is based on the fact that a throttle valve is situated in the intake area of the engine, that an exhaust emission control device is situated in the exhaust duct, that a predefined air flow setpoint value is set using the throttle valve, and that at least one control signal of the engine is provided on the basis of a first dataset stored in a characteristics map. The method according to the present invention provides that, in the event of a request for heating and/or regenerating the exhaust emission control device, the air flow setpoint value predefined for the throttle valve is changed, that a diagnosis of the throttle valve is performed, that an error signal is provided when a throttle valve error is detected, that a switch is made to an additional dataset in the characteristics map when the error signal and the request are present, and that the at least one control signal is provided on the basis of the additional dataset.

The exhaust emission control device, which may be a catalytic converter and/or an (NOx) storage catalytic converter and/or a particulate filter, must be additionally heated in certain operating states of the internal combustion engine in order to reach the required operating temperature. To re-establish the storage capability, a regeneration must be carried out periodically in storing exhaust emission control devices. A predefined temperature range of the exhaust treatment device may likewise be required for regeneration. The temperature for initiating the regeneration of a particulate filter is approximately 550° C.–650° C., for example. The temperature increase may be achieved, for example, by increasing the exhaust gas temperature. In another application, the increase in the temperature of the exhaust emission control device is achieved via a change in the composition of the exhaust gas components which react exothermally downstream from or in the exhaust emission control device. In addition to a predefined operating temperature, a certain composition of the exhaust gas components may also be required for carrying out the regeneration of the exhaust emission control device. An NOx storage catalytic converter may be regenerated, for example, via enrichment of the air-fuel mixture supplied to the internal combustion engine, resulting in the occurrence of unburned hydrocarbon portions in the exhaust gas.

The predefined heating measure is initiated by re-determining at least one control signal of the internal combustion engine on the basis of a second dataset stored in the characteristics map. An air flow setpoint value which is affected via the throttle valve may be changed in particular. An error occurring in the throttle valve may result in the throttle valve no longer being able to be adjusted. The provision of the at least one control signal of the internal combustion engine on the basis of the second dataset may result in the heating measure being either insufficient or carried out too intensely. An intended exhaust gas composition may likewise no longer be able to be achieved. If the operating temperature of the exhaust emission control device falls short, the exhaust emission control device is no longer able to sufficiently clean the exhaust gas. There is the possibility that the exhaust emission control device may no longer be regenerated. If the exhaust emission control device is a particulate filter, an increased exhaust gas backpressure may occur in the absence of the regeneration which could result in increased fuel consumption or even damage to the internal combustion engine. If the regeneration of the particulate filter is carried out when the particulate filter is overloaded, the particulate filter may be thermally damaged due to the intense exothermal reaction.

The measure according to the present invention also enables heating and/or regeneration of the exhaust emission control device, even when a throttle valve error occurred, via changing the at least one control signal of the internal combustion engine by switching from the first or second dataset to an additional dataset stored in the characteristics map. The data stored in the additional dataset is to be defined on the basis of an application by taking the different possible throttle valve errors into account.

The measure according to the present invention is particularly suitable for application in diesel engines, a throttle valve currently being increasingly placed in their intake area in order to be able to set the operating conditions required for the exhaust emission control device.

DETAILED DESCRIPTION

Figure 1:
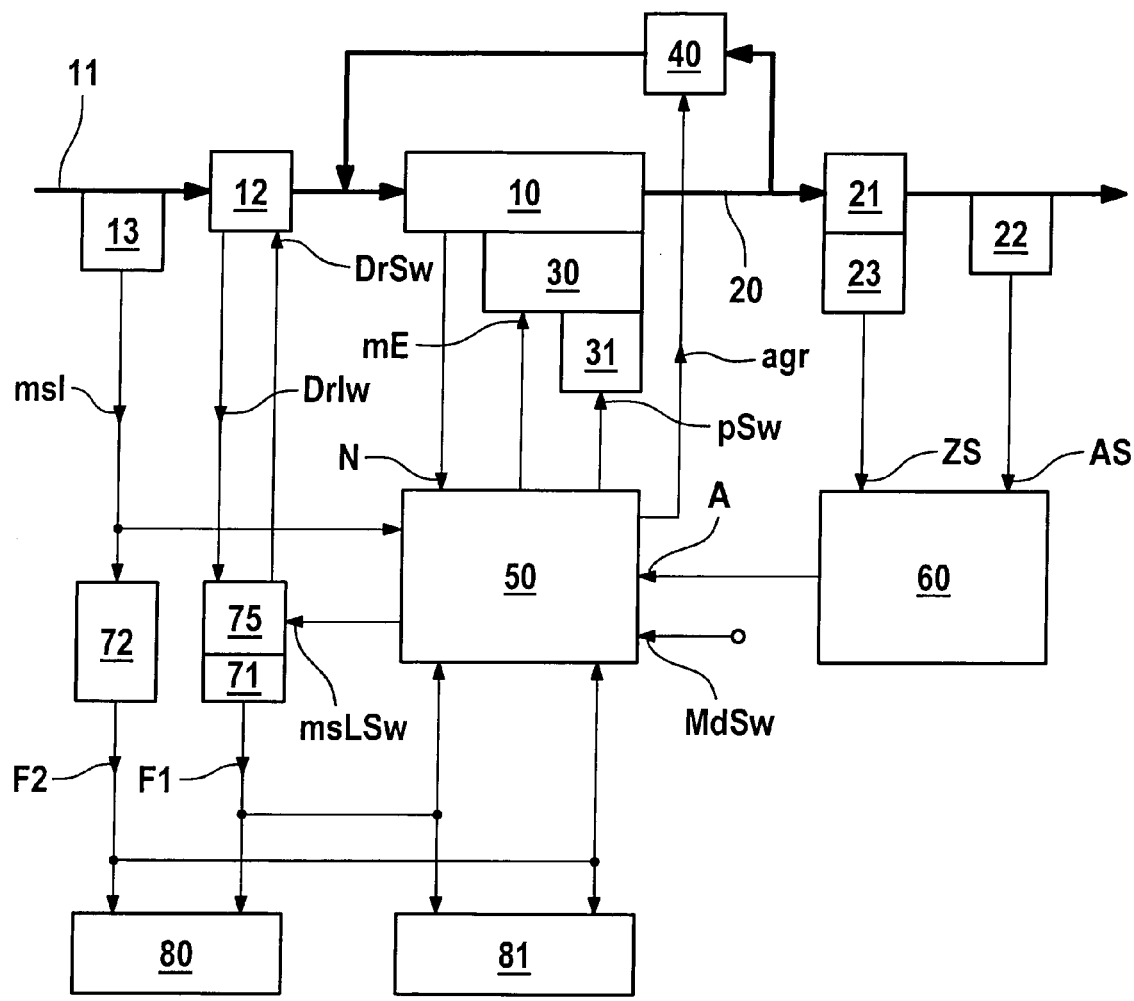
FIG. 1 shows a technical environment in which a method according to the present invention proceeds.

FIG. 1 shows an internal combustion engine 10, a throttle valve 12, and an air sensor 13 being situated in its intake port 11 and an exhaust emission control device 21 and a first sensor 22 being situated in its exhaust duct 20. A second sensor 23 is assigned to exhaust emission control device 21. A fuel metering device 30 and a fuel pressure device 31 are assigned to internal combustion engine 10. Exhaust duct 20 is connected to intake port 11 via exhaust gas recirculation 40.

An engine controller 50 receives an air signal msL provided by air sensor 13, an engine speed signal N provided by internal combustion engine 10, a request A provided by an exhaust emission control device controller 60, a torque setpoint value MdSw, a first error signal F1 provided by a first diagnostics 71, and a second error signal F2 provided by a second diagnostics 72.

As control signals, engine controller 50 outputs a fuel injection signal mE to fuel metering device 30 and a fuel pressure signal pSw to fuel pressure device 31. Furthermore, engine controller 50 outputs an air flow setpoint value msLSw to a throttle valve controller 75 which outputs a throttle valve setpoint value DrSw to throttle valve 12. Throttle valve 12 returns a throttle valve actual value DrIw to throttle valve controller 75. Engine controller 50 makes an exhaust gas recirculation signal agr available to exhaust gas recirculation 40.

First error signal F1 provided by first diagnostics 71 is supplied to an error memory 80 and a display 81. Second error signal F2 provided by second diagnostics 72 is also supplied to error memory 80 and display 81.

First sensor 22 outputs an exhaust gas signal AS to exhaust emission control device controller 60 and second sensor 23 outputs a status signal ZS.

Figure 2:
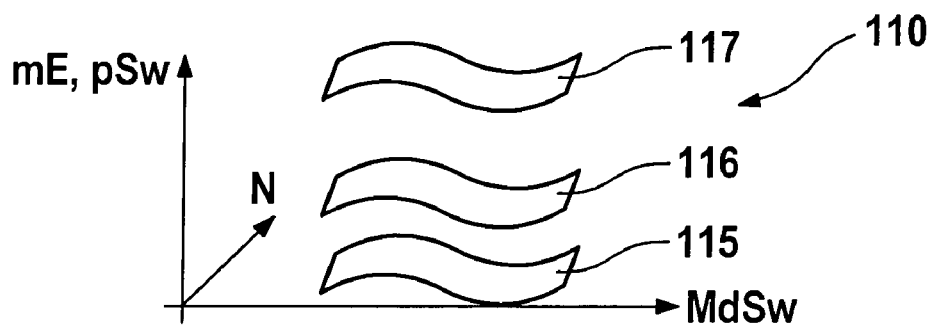
FIG. 2 shows a characteristics map.

FIG. 2 shows a characteristics map 110 which is spanned by engine speed N and torque setpoint value MdSw. Characteristics map 110 provides the at least one control signal mE, pSw. Characteristics map 110 contains a first, a second, and an additional dataset 115, 116, 117.

Figure 3:
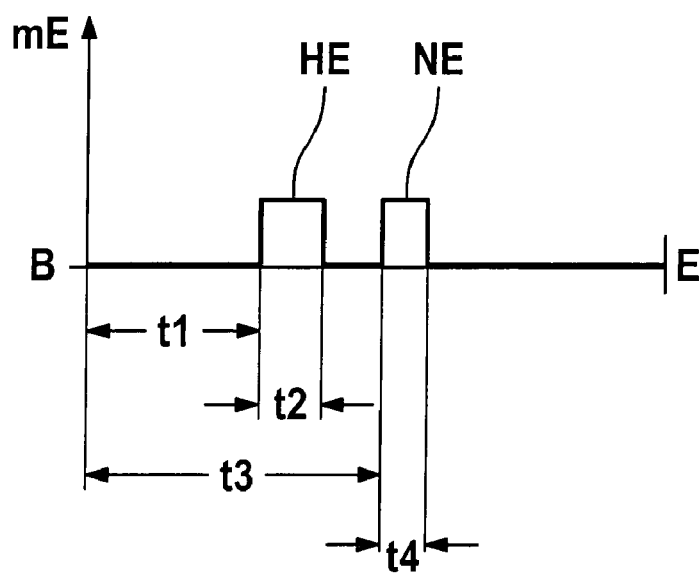
FIG. 3 shows a control signal of an internal combustion engine.

FIG. 3 shows fuel injection signal mE in a power stroke of internal combustion engine 10. Starting from a start B of the power stroke, a first injection signal HE occurs after a first time period t1, the first injection signal lasting a second time period t2. A second injection signal NE occurs after a third time period t3, the second injection signal lasting a fourth time period t4. The power stroke ends at power stroke end E.

The method according to the present invention functions as follows:

Exhaust emission control device 21 cleans the exhaust gas of internal combustion engine 10 of at least one exhaust gas component. Exhaust emission control device 21 may be, for example, a catalytic converter and/or an (NOx) storage catalytic converter and/or a particulate filter. For carrying out the cleaning task, exhaust emission control device 21 requires a predefined temperature range.

Additionally or alternatively, a regeneration of the exhaust emission control device may become necessary. The regeneration is necessary, for example, in a storage catalytic converter and in a particulate filter to re-establish the storage capability. Exhaust gas signal AS provided by first sensor 22 is a measure for a characteristic of the exhaust gas. In this instance it is the air value lambda and/or the NOx concentration and/or the exhaust gas temperature. As a function of the design of exhaust emission control device 21, exhaust gas signal AS may be used for detecting whether heating of exhaust emission control device 21 and/or a regeneration is/are necessary.

Second sensor 23, which is assigned to exhaust emission control device 21, outputs status signal ZS to exhaust emission control device controller 60 as a measure for the status of exhaust emission control device 21. Status signal ZS detects, for example, the temperature and/or the pressure or differential pressure occurring at exhaust emission control device 21. Alternatively or additionally, status signal ZS may also be used for detecting whether heating of exhaust emission control device 21 and/or a regeneration is/are necessary.

If exhaust emission control device 21 must be heated and/or regenerated, exhaust emission control device controller 60 outputs request A to engine controller 50.

During normal operation of internal combustion engine 10, engine controller 50 determines the at least one control signal mE, pSw on the basis of first dataset 115 stored in characteristics map 110. Fuel injection signal mE is preferably provided as the control signal which is supplied to fuel metering device 30. Fuel metering device 30 may be electrically controllable injectors.

Fuel injection signal mE, which is shown in FIG. 3 as an example, determines, for example, the number of injection signals HE, NE, time periods t1, t3 until initialization of injection signals HE, NE, as well as time periods t2, t4 of injection signals HE, NE. Furthermore, fuel pressure signal pSw is preferably provided as the control signal which establishes the pressure in fuel pressure device 31 which may be, for example, a fuel pump which defines the pressure in a common rail from which fuel metering device 30 draws the pressurized fuel.

When request A occurs, engine controller 50 changes air flow setpoint value msLSw which is supplied to throttle valve controller 75. A change in air flow setpoint value msLSw results in an adaptation of throttle valve setpoint value DrSw which in turn causes an adjustment of the throttle valve position. Limiting the air flow by changing the throttle valve position results in a change, in particular in an increase in the exhaust gas temperature and/or in a change in the exhaust gas components.

When request A occurs, the at least one control signal mE, pSw of internal combustion engine 10 is preferably changed at the same time. The change may be carried out by simply switching from first dataset 115 to second dataset 116. The at least one control signal mE, pSw correspondingly assumes other values which are suitable for heating and/or regenerating the exhaust emission control device. In a diesel engine 10, the exhaust gas temperature and/or the content of unburned hydrocarbons in the exhaust gas may be affected in particular by an after-injection NE, second injection signal NE in the shown exemplary embodiment, which takes place subsequent to at least one main injection HE. An increase in the exhaust gas temperature is the result of deteriorating efficiency of internal combustion engine 10. The increase in the concentration of unburned hydrocarbons in the exhaust gas is the result of partial combustion or may occur due to the fact that the subsequently injected fuel quantity no longer ignites.

First diagnostics 71 monitors throttle valve 12. First diagnostics 71 checks, for example, the presence of electrical errors. Such an error is a short circuit or an open line, for example. Moreover, first diagnostics 71 may check whether a change in throttle valve setpoint value DrSw results in a corresponding change in throttle valve actual value DrIw. Throttle valve setpoint value DrSw defines a certain throttle valve position, for example. Furthermore, first diagnostics 71 may perform a plausibility check of the functionality of throttle valve 12 involving air signal msL which is provided by air sensor 13. When an error is detected, first diagnostics 71 outputs first error signal F1.

First error signal F1 is stored in error memory 80 for later analysis and/or is displayed on display 81. First error signal F1 causes engine controller 50 to switch to additional dataset 117. The switch may take place from first dataset 115 or from second dataset 116, depending on whether engine controller 50 already switched from first dataset 115 to second dataset 116 when request A occurred.

Second diagnostics 72 checks air signal msL provided by air sensor 13. Second diagnostics 72 may check air signal msL with regard to static and dynamic errors. Moreover, second diagnostics 72 may check air sensor 13 with regard to electrical errors. In the event of an error, the second diagnostics provides second error signal F2 which again may be stored in error memory 80 and/or may be displayed on display 81. If second error signal F2 is present, the plausibility check of air flow setpoint value msLSw involving air signal msL provided by air sensor 13 may no longer be performed. If needed, second error signal F2 may cause engine controller 50 to switch to another dataset in characteristics map 110.

What is claimed is:

1. A method for operating an internal combustion engine, a throttle valve being situated in an intake port and an exhaust emission control device being situated in an exhaust duct, the method comprising:
    setting a predefined air flow setpoint value using the throttle valve;
    providing at least one control signal of the internal combustion engine on the basis of a first dataset stored in a characteristics map;
    changing the air flow setpoint value predefined for the throttle valve following an occurrence of a request for at least one of heating and regenerating the exhaust emission control device;
    performing a first diagnosis of the throttle valve;
    providing a first error signal when a throttle valve error is detected; and
    making a switch to an additional dataset in the characteristics map when the first error signal and the request are present,
    wherein the at least one control signal is provided on the basis of the additional dataset.

2. The method according to claim 1, wherein the first diagnosis is performed based on a measured air signal provided by an air sensor, and the first error signal is provided when the predefined air flow setpoint value deviates from the measured air signal.

3. The method according to claim 1, wherein the first error signal is provided when an electrical error of the throttle valve is detected in the first diagnosis.

4. The method according to claim 1, further comprising at least one of storing the first error signal in an error memory and displaying the first error signal on a display.

5. The method according to claim 4, further comprising:
    performing a diagnosis of the air sensor; and
    when an air sensor error is detected, providing an additional error signal which is at least one of stored in the error memory and displayed on the display.

6. The method according to claim 1, further comprising providing at least one of (a) a pressure setpoint value, to be predefined for a fuel pressure device, as the control signal and (b) a fuel injection signal, to be predefined for a fuel metering device.

7. The method according to claim 6, further comprising specifying at least one of (a) an injection-start of at least one fuel injection by the fuel injection signal, (b) a time period of at least one fuel injection and (c) a number of fuel injections during one power stroke of the internal combustion engine.

8. The method according to claim 1, further comprising, when the request occurs, switching an engine controller from the first dataset to a second dataset in the characteristics map, the at least one control signal of the internal combustion engine being provided on the basis of the second dataset.

9. A device for operating an internal combustion engine, a throttle valve being situated in an intake port and an exhaust emission control device being situated in an exhaust duct, the device comprising:
    means for setting a predefined air flow setpoint value using the throttle valve;
    means for providing at least one control signal of the internal combustion engine on the basis of a first dataset stored in a characteristics map;
    means for changing the air flow setpoint value predefined for the throttle valve following an occurrence of a request for at least one of heating and regenerating the exhaust emission control device;
    means for performing a first diagnosis of the throttle valve;
    means for providing a first error signal when a throttle valve error is detected; and
    means for making a switch to an additional dataset in the characteristics map when the first error signal and the request are present,
    wherein the at least one control signal is provided on the basis of the additional dataset.

* * * * *